United States Patent

Bauer et al.

Patent Number: 5,948,910
Date of Patent: Sep. 7, 1999

[54] WATER-SOLUBLE PERYLENE DYESTUFFS, THEIR PREPARATION AND THEIR USE

[75] Inventors: Wolfgang Bauer, Maintal; Dieter Baumgart, Egelsbach; Dieter Schnaitmann, Eppstein; Klaus-Peter Kreutzer, Nidderau; Walter Zöller, Klingenberg, all of German Dem. Rep.

[73] Assignee: Clariant GmbH, Frankfurt, Germany

[21] Appl. No.: 08/935,098

[22] Filed: Sep. 25, 1997

[30] Foreign Application Priority Data

Sep. 30, 1996 [DE] Germany .......................... 196 40 182

[51] Int. Cl.$^6$ .......................... C09B 3/18; C07D 401/14
[52] U.S. Cl. .......................... 544/198; 544/209; 544/212
[58] Field of Search .................. 544/198, 209, 544/213, 212

[56] References Cited

U.S. PATENT DOCUMENTS

| | | | |
|---|---|---|---|
| 2,914,531 | 11/1959 | Staeuble et al. | 260/249.5 |
| 3,515,732 | 6/1970 | Staeuble et al. | 260/354 |
| 3,846,141 | 11/1974 | Ostergren et al. | 106/22 |
| 3,856,536 | 12/1974 | Siegelman et al. | 106/22 |
| 3,906,513 | 9/1975 | Siegelman et al. | 346/140 |
| 4,024,096 | 5/1977 | Wachtel | 260/29.3 |
| 4,024,397 | 5/1977 | Weiner | 250/338 |
| 4,070,322 | 1/1978 | Huang et al. . | |

FOREIGN PATENT DOCUMENTS

| | | |
|---|---|---|
| 1103286 | 10/1961 | Germany . |
| 2132324 | 6/1972 | Germany . |
| 2160475 | 6/1972 | Germany . |
| 432693 | 9/1967 | Switzerland . |

OTHER PUBLICATIONS

Angew. Chem. /63 Jahrg. 1951 Nr. 14 (327–328) : Verwendung des xylolsulfosauren Natriums als hydrotope Verbindung in der chemischen Industrie, 1951.

Chemiker–Zeitung, 96. Jahrgang (1972) Nr. 5: Eigwenschaften von Tensiden in Lösungen hydrotoper Substanzen (Von Milan Johan Schwuger).

Ullmann's Encyclopedia of Industrial Chemistry, Fifth, Completely Revised Edition /vol. A 13: "High–Performance Fibers to Imidazole and Derivatives".

Ink–Jet Printing: P. Gregory, High Technology Applications of Organic Colorants, Plenum Press, New York, (1991), pp. 197–201.

JSDC Apr. 1973 (128–132) : "Aggregation of Anionic Dyes in Aqueous Solutions".

Encyclopedia of Chemical Technology 3rd ed. (1982) V. 20, Kirk Othmer—Repography.

Chemistry and Technology of Printing and Imaging Systems: Blackie Academic & Professional. London, 1996.

Neure Experimente zum Chemismus der Hydrotropie (I)*): Melliand 43, 718 (1962).

*Primary Examiner*—John M. Ford
*Assistant Examiner*—Ann Razgunas
*Attorney, Agent, or Firm*—Scott E. Hanf

[57] ABSTRACT

Water-soluble perylene dyestuffs, their preparation and their use

The present Application relates to water-soluble perylene dyestuffs of the formula

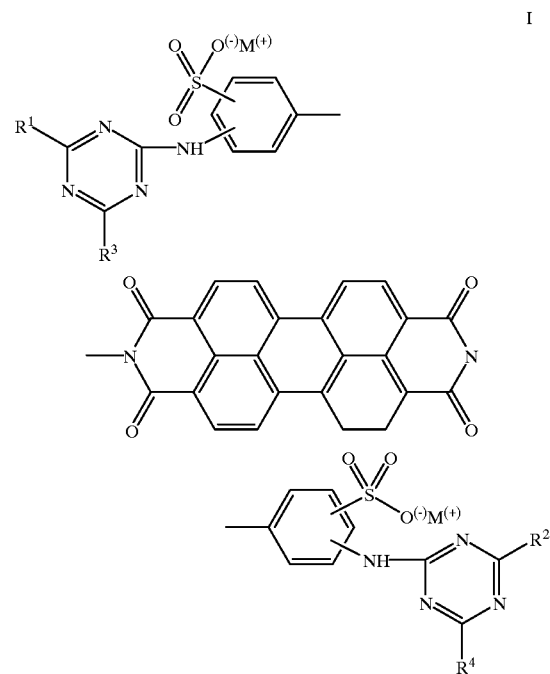

in which $R^1$ and $R^2$ independently of one another are the radicals A—X—COOM or A—X—SO$_3$M;

$R^3$ and $R^4$ independently of one another are the radicals $R^1$ or $R^2$, or are OR$^5$ or NR$^6$R$^7$;

A is NR$^8$ or S;

X is a straight-chain or branched alkylene radical, a straight-chain or branched alkylene radical which is substituted by hydroxyl, carboxyl or amino, an arylene radical or an arylene radical which is optionally substituted by hydroxyl, carboxyl or sulfo;

$R^5$, $R^6$ and $R^7$ independently of one another are hydrogen, (C$_1$–C$_4$)-alkyl or (C$_1$–C$_4$)-alkyl which is substitituted by one or more hydroxyl, 2-hydroxyethoxy, (C$_1$–C$_4$)-alkoxy or amino groups;

$R^8$ is hydrogen, methyl or ethyl and

M is a monovalent cation or one equivalent of a polyvalent cation, processes for their preparation, their use for dyeing and printing naturally occurring and synthetic fiber materials, and recording liquids, in particular for the ink-jet process, and liquid formulations for dyeing paper in the pulp which comprise the dyestuffs according to the invention.

7 Claims, No Drawings

WATER-SOLUBLE PERYLENE DYESTUFFS, THEIR PREPARATION AND THEIR USE

DESCRIPTION

Water-soluble perylene dyestuffs, their preparation and their use

The present invention relates to water-soluble perylene dyestuffs, processes for their preparation, their use for dyeing and printing naturally occurring and synthetic fiber materials, in particular for the ink-jet process, and liquid formulations for dyeing paper in the pulp which comprise the dyestuffs according to the invention.

The ink-jet process is a contact less printing process in which droplets of the recording liquid are guided from one or more nozzles onto the substrate to be printed. To obtain prints of high sharpness and good resolution, the recording liquids or the dyestuffs contained therein must meet high requirements, in particular in respect of purity, absence of particles, solubility, storage stability, viscosity, surface tension and conductivity. In particular, very high requirements are imposed on the tinctorial strength, brilliance and fastness properties, such as, for example, fastness to light, fastness to water and fastness to rubbing. A high fastness to light is of great importance in particular for ink-jet applications outdoors and in the production of ink-jet prints of photographic quality.

The ink-jet process and the requirements imposed on the dyestuffs and recording liquids are described, for example, in: Kirk-Othmer, Encyclopedia of Chemical Technology, 3rd Edition, Volume 20 (1982), 153–156; Ullmann's Encyclodedia of Industrial Chemistry, 5th Edition, Volume A 13 (1989), 588–594; and R. W. Kenyon, in P. Gregory, Chemistry and Technology of Printing and Imaging Systems, Blackie & Professional, London, 1996.

The development of water-soluble magenta dyestuffs which have the desired combination of high brilliance and tinctorial strength, high fastness to light and good fastness to water has to date proven very difficult (cf., for example, P. Gregory, High-Technology Applications of Organic Colorants, Plenum Press, New York (1991), pages 197–201).

There is thus a need for water-soluble dyestuffs which are superior, in particular in fastness to light, to the magenta dyestuffs already known and at the same time have the other properties required for the ink-jet sector.

Water-soluble chlorine-containing perylene dyestuffs which can be employed as batch or reactive dyestuffs for dyeing or printing cotton fibers are already known and are described, for example, in U.S. Pat. Nos. 3 515 732, 2,914, 531 and DE-C 1 103 286. However, the chlorine-containing perylene dyestuffs specified in the patent documents mentioned have disadvantages when preparing recording liquids for the ink-jet process, in particular in respect of water-solubility, the storage stability of inks and recording liquids and the brilliance of the resulting prints.

Surprisingly, it has now been found that the requirements imposed are met by certain water-soluble chlorine-free perylene dyestuffs.

The present invention thus relates to water-soluble perylene dyestuffs of the formula I

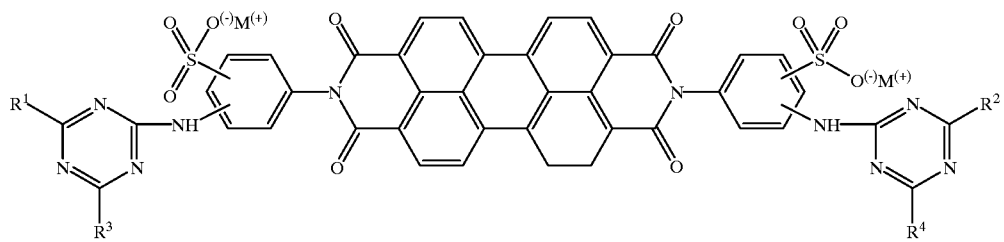

I in which $R^1$ and $R^2$ independently of one another are the radicals A—X—COOM or A—X—SO$_3$M;

$R^3$ and $R^4$ independently of one another are the radicals $R^1$ or $R^2$, or are OR$^5$ or NR$^6$R$^7$;

A is NR$^8$ or S;

X is a straight-chain or branched alkylene radical, a straight-chain or branched alkylene radical which is substituted by hydroxyl, carboxyl or amino, an arylene radical or an arylene radical which is optionally substituted by hydroxyl, carboxyl or sulfo;

$R^5$, $R^6$ and $R^7$ independently of one another are hydrogen, (C$_1$–C$_4$)-alkyl or (C$_1$–C$_4$)-alkyl which is substitituted by one or more hydroxyl, 2-hydroxyethoxy, (C$_1$–C$_4$)-alkoxy or amino groups;

$R^8$ is hydrogen, methyl or ethyl and

M is a monovalent cation or one equivalent of a polyvalent cation.

X is preferably a straight-chain or branched (C$_1$–C$_6$)-alkylene radical, a straight-chain or branched (C$_1$–C$_6$)-alkylene radical which is substituted by hydroxyl, carboxyl or amino, a phenylene radical or a phenylene radical which is optionally substituted by hydroxyl, carboxyl or sulfo. X is particularly preferably a (C$_1$–C$_4$)-alkylene or phenylene radical. X is, for example, methylene, ethylene, ethane-1,1-diyl, propane-1,1-diyl, 1,2-propylene, 1,6-hexylene, 2-methylpropane-1,1-diyl, 3-methylbutane-1,1-diyl 2-methylbutane-1,1-diyl, 2-hydroxyethane-1,1-diyl, 2-carboxyethane-1, 1-diyl, 3-carboxypropane-1,1-diyl, 5-aminopentane-1,1-diyl, 3-aminopropane-1,1-diyl or 4-aminobutane-1,1 diyl.

$R^5$, $R^6$ and $R^7$ are, for example, hydrogen, hydroxyethyl, 2-hydroxypropyl, 3-hydroxypropyl, methoxyethyl or ethoxyethyl, where hydrogen, hydroxyethyl and hydroxypropyl are preferred.

$R^8$ is, for example, hydrogen, methyl or ethyl, where hydrogen is preferred.

M is preferably a lithium, sodium or potassium ion or an ammonium ion of the formula II $$R^9R^{10}R^{11}R^{12}N^{\oplus} \qquad (II)$$

in which $R^9$, $R^{10}$, $R^{11}$ and $R^{12}$ independently of one another are hydrogen, unsubstituted (C$_1$–C$_4$)-alkyl or (C$_1$–C$_4$)-alkyl which is substituted by one or more hydroxyl or 2-hydroxyethoxy groups. M moreover is preferably a mixture of the cations mentioned.

In preferred water-soluble perylene dyestuffs of the formula I, the radicals $R^1$, $R^2$, $R^3$ and $R^4$ independently of one another are A—X—COOM or A—X—$SO_3$M, in which A, X and M have the abovementioned meaning.

In particularly preferred dyestuffs of the formula I according to the invention, the radicals $R^1$, $R^2$, $R^3$ and $R^4$ independently of one another are A—X—COOM, in which A and X have the abovementioned meaning.

The perylene dyestuffs of the formula I according to the invention can be prepared, for example, by reacting perylene dyestuffs of the formula III Possible amines of the formula (VII) are, for example, ammonia, methylamine, ethylamine, propylamine, hexylamine, ethanolamine, diethanolamine, 2-aminopropanol, 3-aminopropanol, dipropylamine and N-methylethanol.

The perylene dyestuffs of the formula I according to the invention can be isolated from the initially resulting, preferably aqueous reaction mixtures by customary methods of working up, for example by salting out, filtration or by spray drying, if appropriate after desalination by means of membrane filtration. However, isolation can be dispensed with

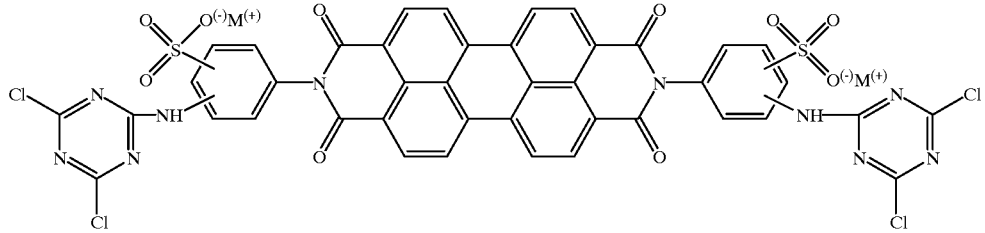

(III)

in which M has the abovementioned meaning, with compounds of the formulae IV, V, VI and/or VII

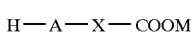 (IV)

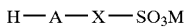 (V)

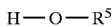 (VI)

 (VII)

in which A, X, M, $R^5$, $R^6$ and $R^7$ are as defined above.

The reactions are usually carried out in an aqueous medium at pH values of 7 to 14, preferably pH 7.5 to 11, and temperatures of –10° C. to 140° C., preferably 10 to 120° C.

The compound of the formula III can be prepared in a manner known per se from perylenetetracarboxylic acid anhydride and 1,4-phenylenediamine-2-sulfonic acid or 1,3-phenylenediamine-4-sulfonic acid in a molar ratio of 1:2 with subsequent reaction with 2 mol of cyanuric chloride.

Carboxylic acids of the formula (IV) which can be employed in the process according to the invention are, for example, glycine, N-methylglycine, 2-aminopropionic acid, 3-aminopropionic acid, 2-aminobutyric acid, 3-aminobutyric acid, 6-aminohexanecarboxylic acid, valine, leucine, isoleucine, serine, aspartic acid, glutamic acid, lysine, 1,3-diaminobutyric acid, 1,4-diaminopentanecarboxylic acid, 2-aminobenzenecarboxylic acid, 3-aminobenzenecarboxylic acid, 4-aminobenzenecarboxylic acid and 5-aminobenzene-1,3-dicarboxylic acid.

Suitable sulfonic acids of the formula (V) are, for example, aminomethanesulfonic acid, taurine, 2-aminopropanesulfonic acid, 3-aminopropanesulfonic acid, 2-aminobenzenesulfonic acid, 3-aminobenzenesulfonic acid, 4-aminobenzenesulfonic acid and 4-aminobenzene-1,3-disulfonic acid.

Hydroxy compounds of the formula (VI) which can be employed are, for example, water, methanol, ethanol, isopropanol, n-butanol, isobutanol, glycol, propylene glycol, glycol monomethyl ether, glycol monoethyl ether and glycol monobutyl ether.

and the reaction mixtures containing dyestuffs of the formula I according to the invention can be converted directly into concentrated dyestuff solutions by addition of organic and/or inorganic bases and/or hydrotropic agents.

Possible inorganic bases are, for example, lithium hydroxide, lithium carbonate, sodium hydroxide, sodium bicarbonate, potassium hydroxide, potassium carbonate and ammonia. Suitable organic bases are, for example, monoethanolamine, diethanolamine, triethanolamine, 2-amino-propanol, 3-aminopropanol, dipropanolamine, tripropanolamine, N-methylaminoethanol, N,N-dimethylaminoethanol, N-phenylaminopropanol, ethylenediamine, tetramethylethylenediamine, tetramethylpropylenediamine, tetramethylhexylenediamine, diethylenetriamine, triethylenetetramine and polyethyleneimine.

Hydrotropic compounds are described, for example, in Melliand 43, 718 (1962), Angew. Chem. 63, 327 (1951), J. Soc. Dyers. Col. 1973, 128 and Chemiker-Zeitung 96, 248 (1972). Possible compounds are, for example, formamide, urea, tetramethylurea, e-caprolactam, ethylene glycol, diethylene glycol, triethylene glycol, polyethylene glycol, butylglycol, methylcellosolve, glycerol, N-methylpyrrolidone, 1,3-diethyl-2-imidazolidinone, sodium xylenesulfonate, sodium cumenesulfonate and sodium butylmonoglycol sulfate.

The present invention also relates to the use of water-soluble perylene dyestuffs of the formula I for dyeing and printing naturally occurring and synthetic fiber materials, in particular for recording writing and images on various recording media, and for dyeing paper or celluloses in the pulp.

The perylene dyestuffs of the formula I according to the invention are suitable, for example, as coloring agents in electrophotographic toners and developers, such as, for example, one-component and two-component powder toners, magnetic toners, liquid toners and polymerization toners, as well as other special toners (see, for example, L. B. Schein, Electrophotography and Development Physics, Springer Series in Electrophysics 14, Springer Verlag, 2nd Edition, 1992 ).

The dyestuffs of the formula I according to the invention are particularly suitable for the preparation of recording liquids, in particular inks for the ink-jet printing process, but also for other printing, duplicating, marking, writing, drawing, stamping or recording processes. Red print images of excellent quality which are distinguished by a very good brilliance and print sharpness and by a very good fastness to light, resistance to abrasion and fastness to water, including on normal, non-coated grades of paper, are obtained in these processes.

The present invention also relates to recording liquids which comprise one or more water-soluble perylene dyestuffs of the formula I. Such recording liquids are prepared by processes known per se. Information on compositions, including in particular those of inks for the ink-jet printing process, is to be found, for example, in U.S. Pat. Nos. 3,856,536, 3,906,513, 3,846,141, 4,024,096, 4,024,397 and 4,070,322. The precise composition of the recording liquids is of course adapted to suit the intended purpose of use.

The finished recording liquids in general comprise 0.5 to 15% by weight (calculated in the dry state) in total of one or more soluble dyestuffs of the formula I, 0 to 99% by weight of water and 0.5 to 99.5% by weight of solvent and/or humectant. In a preferred embodiment, the finished recording liquids comprise 0.5 to 15% by weight of dyestuff, 40 to 85% by weight of water and 10 to 50% by weight of solvent and/or humectant, and in another preferred embodiment it comprises 0.5 to 15% by weight of dyestuffs, 0 to 20% by weight of water and 70 to 99.5% by weight of solvent and/or humectant. The finished recording liquids can also comprise further additives mentioned below.

Water used for preparation of the recording liquids is preferably employed in the form of distilled or desalinated water. The solvents and/or humectants contained in the recording liquids can be an organic solvent or a mixture of such solvents, water-miscible solvents being preferred. Suitable solvents are, for example, mono- or polyhydric alcohols, and ethers and esters thereof, for example alkanols, in particular having 1 to 4 carbon atoms, such as, for example methanol, ethanol, propanol, isopropanol, butanol or isobutanol; di- or trihydric alcohols, in particular having 2 to 6 carbon atoms, for example ethylene glycol, propylene glycol, 1,3-propanediol, 1,4-butanediol, 1,5-pentanediol, 1,6-hexanediol, 1,2,6-hexanetriol, glycerol, diethylene glycol, dipropylene glycol, triethylene glycol, polyethylene glycol, tripropylene glycol or polypropylene glycol; lower alkyl ethers of polyhydric alcohols, such as, for example, ethylene glycol monomethyl, -ethyl or -butyl ether or triethylene glycol monomethyl or -ethyl ether; ketones and ketone alcohols, such as, for example, acetone, methyl ethyl ketone, diethyl ketone, methyl isobutyl ketone, methyl pentyl ketone, cyclopentanone, cyclohexanone or diacetone alcohol; amides, such as, for example, dimethylformamide, dimethylacetamide or N-methylpyrrolidone; and furthermore urea, tetramethylurea or thiodiglycol.

The recording liquids according to the invention can furthermore also comprise customary additives, for example preservatives, cationic, anionic or nonionic surface-active substances (surfactants and wetting agents) and agents for regulating the viscosity, for example polyvinyl alcohol or cellulose derivatives, or water-soluble naturally occurring or synthetic resins as film-forming agents or binders to increase the adhesive strength and abrasion resistance.

Amines, such as, for example, ethanolamine, diethanolamine, triethanolamine, N,N-dimethylethanolamine and diisopropylamine, serve chiefly to increase the pH of the recording liquid. They are usually present in the recording liquid to the extent of 0 to 10% by weight, preferably 0.5 to 5% by weight.

In the case of recording liquids for the ink-jet printing process, depending on the embodiment of this printing process, for example as a continuous jet, intermittent jet, pulse jet or compound jet process, further additives can also be added, if appropriate, for example for buffering the pH or for adjusting the electrical conductivity, the specific heat, the coefficient of thermal expansion and the conductivity.

The recording liquids can be prepared in a simple manner by mixing the components, which can be carried out, for example, by a procedure in which one or more dyestuffs of the formula I are dissolved in water and/or a solvent, or also by a procedure in which an aqueous solution obtained during the preparation of the dyestuff of the formula I is diluted to the desired extent, if appropriate after suitable preparation, and further components, such as water, solvent, additives and the like, are then admixed.

During storage of recording liquids according to the invention, no separating out of precipitates, which leads to blurred print images or to blockage of nozzles, occurs.

The recording liquids according to the invention are in ranges in respect of viscosity and surface tension which are suitable for the ink-jet process. They produce print images of high optical density with excellent fastness to light, fastness to water, resistance to abrasion and resolution.

Brilliant red dyeings which are distinguished by a high color strength and very good fastness properties, such as, for example, fastness to water, fastness to cylinders, fastness to bleeding, fastness to acid, fastness to alkali and, in particular, fastness to light are obtained with the dyestuffs of the formula I according to the invention when these are used for dyeing paper or celluloses in the pulp. It is furthermore advantageous that the dyestuffs of the formula I according to the invention have a high affinity or substantivity for cellulose fiber, so that ecologically favorable dyehouse waste waters are obtained.

The present invention also relates to concentrated liquid formulations for dyeing paper in the pulp, which comprise one or more water-soluble perylene dyestuffs of the formula I. The liquid formulations according to the invention for dyeing paper in the pulp preferably comprise 0.5 to 30% by weight, particularly preferably 10 to 20% by weight of one or more dyestuffs of the formula I. The liquid formulations according to the invention can comprise hydrotropic compounds known per se of the type already mentioned, for example in an amount of 0.5 to 30% by weight.

The following examples serve to illustrate the invention, but without limiting it. The contents data are percentages by weight.

EXAMPLE 1

78.1 g of a dyestuff of the formula

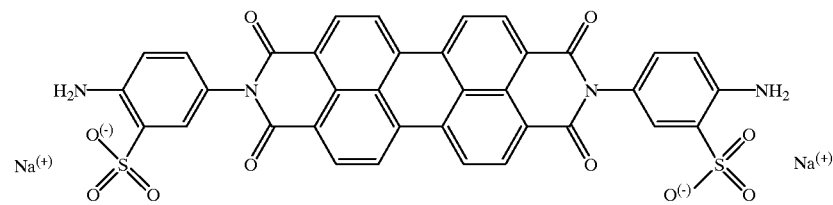

prepared from perylenetetracarboxylic acid anhydride and 1,4-phenylene-2-sulfonic acid in a molar ratio of 1:2 are introduced into 900 ml of water, and 48.6 g of cyanuric chloride are added at 15° C. The pH of the reaction mixture is kept at pH 3.5 by addition of 64.0 g of sodium bicarbonate. The mixture is subsequently stirred for 10 hours to bring the reaction to completion, and a solution of 37.6 g of glycine in 160 ml of water and 50 ml of 10N sodium hydroxide solution are added to the resulting dyestuff of the formula

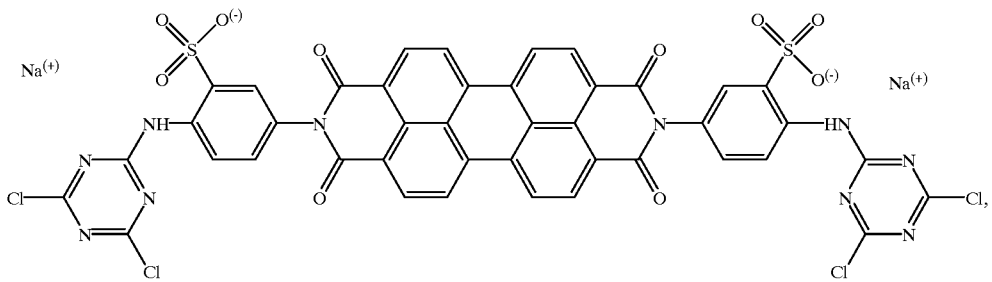

The reaction mixture is then heated to 60° C. and subsequently stirred at 60° C. for 1 hour and at 80° C. for 2 hours, the pH being kept at pH 8 by addition of 13.6 g of sodium carbonate. An intensely bluish-tinged red solution of the dyestuff of the formula

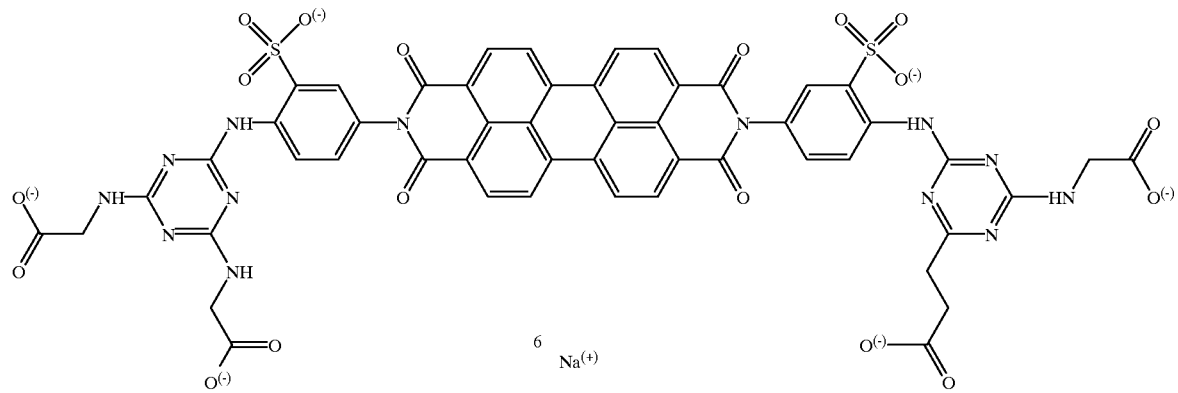

is obtained, which is subsequently desalinated by membrane filtration and dried.
Yield: 130.5 g of red powder
Absorption spectrum in water: $\lambda_{max}$=501 nm, 537 nm.
The perylene dyestuff obtained according to Example 1 is outstandingly suitable for the preparation of recording liquids for the ink-jet process, brilliant bluish-tinged red print images of excellent fastness to light and very good fastness to water being obtained.

EXAMPLE 2

If the procedure is as described in Example 1, but instead of a solution of 37.1 g of glycine in 160 ml of water and 50 ml of 10 N sodium hydroxide solution, a solution of 22.5 g of glycine and 6.5 g of 2-aminoethanol is employed, desalination of the initially resulting dyestuff solution and spray drying give 125.5 g of a red dyestuff of the formula

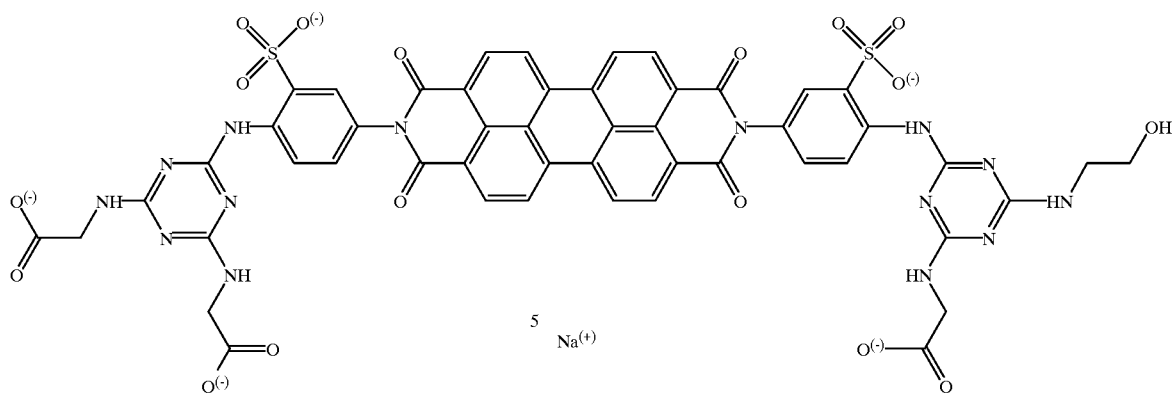

5 which is outstandingly suitable for the preparation of recording liquids for the ink-jet process.
Absorption maximum in water: $\lambda_{max}$:500 nm, 536 nm.

EXAMPLE 3

If 78.1 g of the dyestuff of the formula

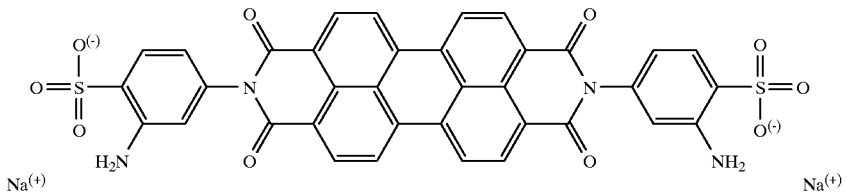

obtained from perylenedicarboxylic acid anhydride and 2 mol of 1,3-phenylenediamine-4-sulfonic acid, are employed and the procedure is as described in Example 1, 128.8 g of the dyestuff of the formula

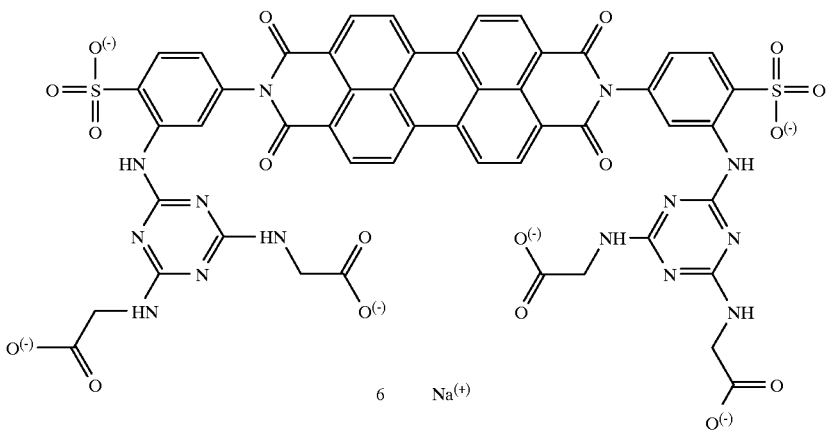

6 which is outstandingly suitable for the preparation of inks for the ink-jet process, is obtained.
Absorption spectrum in water: $\lambda_{max}$=507 nm, 545 nm.

EXAMPLE 4

50.0 g of urea and 2.0 g of a commercially available preservative, for example Mergal K 10 N, are added to 1208.4 g of the dyestuff solution obtained according to Example 4 before the desalination. A 10.4% strength storage-stable solution of the dyestuff which is outstandingly suitable for dyeing paper in the pulp is obtained.

EXAMPLE 5

Preparation of inks having a pure dyestuff content of 2.5%:

2.5 g of pure dyestuff according to Example 1 are introduced into and dissolved in a mixture of 20.0 g of diethylene glycol, 2.5 g of N-methylpyrrolidone, 1.0 g of triethanolamine and 76.4 g of water at 25°C., while stirring.

Further dyestuffs of the formula

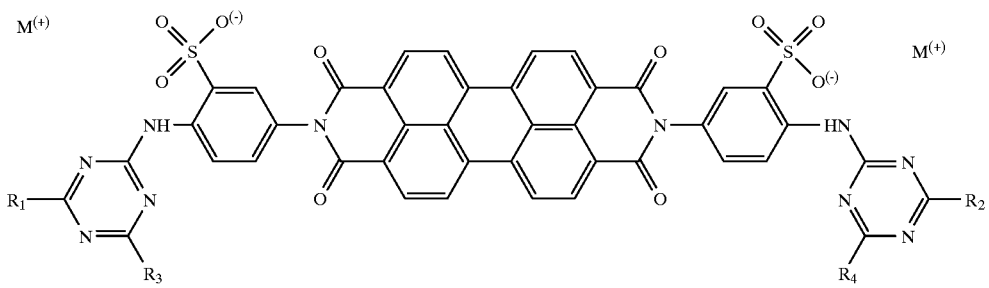

according to the invention are mentioned in the following table, the radicals $R^1$, $R^2$, $R^3$ and $R^4$, which are derived from the compounds of the formulae (IV) to (VII), the cation M and the absorption spectrum in water being listed in the table.

| Example | $R^1$ | $R^2$ | $R^3$ | $R^4$ | M | $\lambda_{max}$ (nm) |
|---|---|---|---|---|---|---|
| 6 | $NHCH_2CH_2SO_3^-$ | $NHCH_2CH_2SO_3^-$ | $NHCH_2CH_2SO_3^-$ | $NHCH_2CH_2SO_3^-$ | $Li^+$ | 501, 538 |
| 7 | " | " | " | $SCH_2COO^-$ | $NH_4^+$ | 503, 539 |
| 8 | " | " | " | $SCH_2CH_2CH_2SO_3^-$ | $K^+$ | 499, 541 |
| 9 | $NHCH_2COO^-$ | $NHCH_2COO^-$ | $NHCH_2COO^-$ | ![benzene dicarboxylate with N-methyl] | $NH_4^+$ | 505, 548 |
| 10 | " | " | " | ![aniline sulfonate with N-methyl] NHCH2 | $HN^+(CH_2CH_2OH)_3$ | 505, 546 |
| 11 | $NH(CH_2)_4CH(NH_2)COOH$ | " | " | $COO^-$ | $Na^+$ | 502, 537 |
| 12 | $NHCH_2COO^-$ | " | " | $N(CH_2CH_2OH)_2$ | $Na^+$ | 501, 538 |
| 13 | " | " | " | $OCH_2CH_2OCH_3$ | $Na^+$ | 498, 535 |
| 14 | " | " | " | $HNCH_2CH_2CH_2N(CH_3)_2$ | $Li^+$ | 500, 543 |

We claim:
1. A water-soluble perylene dyestuff of the formula I

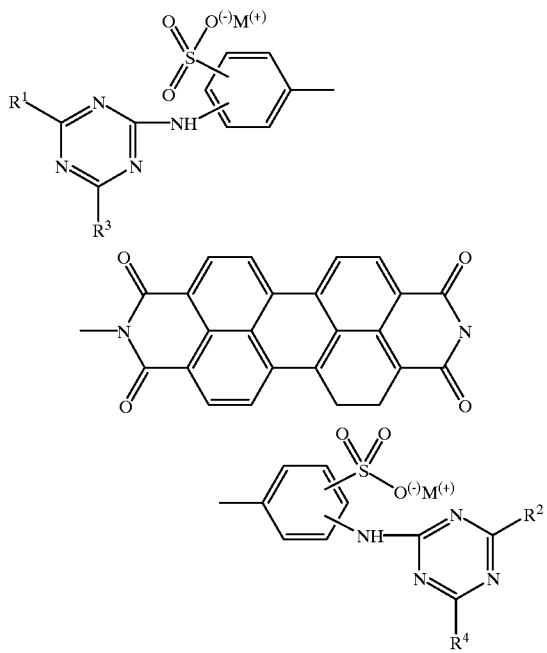

in which
R$^1$ and R$^2$ independently of one another are the radicals A—X—COOM or A—X—SO$_3$M;
R$^3$ and R$^4$ independently of one another are the radicals R$^1$ or R$^2$, or are OR$^5$ or NR$^6$R$^7$;
A is NR$^8$ or S;
X is a straight-chain or branched alkylene radical, a straight-chain or branched alkylene radical which is substituted by hydroxyl, carboxyl or amino, an arylene radical or an arylene radical which is optionally substituted by hydroxyl, carboxyl or sulfo;
R$^5$, R$^6$ and R$^7$ independently of one another are hydrogen, (C$_1$–C$_4$)-alkyl or (C$_1$–C$_4$)-alkyl which is substitituted by one or more hydroxyl, 2-hydroxyethoxy, (C$_1$–C$_4$)-alkoxy or amino groups;
R$^8$ is hydrogen, methyl or ethyl and
M is a monovalent cation or one equivalent of a polyvalent cation.

2. A water-soluble perylene dyestuff as claimed in claim 1, in which X is an alkylene group having 1 to 4 carbon atoms or phenylene.

3. A water-soluble perylene dyestuff as claimed in claim 1, in which R$^5$, R$^6$ and R$^7$ are hydrogen, hydroxyethyl or hydroxypropyl.

4. A water-soluble perylene dyestuff as claimed in claim 1, in which R$^8$ is hydrogen.

5. A water-soluble perylene dyestuff as claimed in claim 1, in which R$^1$, R$^2$, R$^3$ and R$^4$ independently of one another are A—X—COOM or A—X—SO$_3$M.

6. A water-soluble perylene dyestuff as claimed in claim 1, in which M is a lithium, sodium or potassium ion or an ammonium ion of the formula II $$R^9R^{10}R^{11}R^{12}N^\oplus \quad \text{(II)}$$

in which R$^9$, R$^{10}$, R$^{11}$ and R$^{12}$ independently of one another are hydrogen, unsubstituted (C$_1$–C$_4$)-alkyl or (C$_1$–C$_4$)-alkyl which is substituted by one or more hydroxyl or 2-hydroxyethoxy groups, or is a mixture of the cations mentioned.

7. A process for the preparation of a water-soluble perylene dyestuff of the formula I as claimed in claim 1, which comprises reacting a perylene dyestuff of the formula III

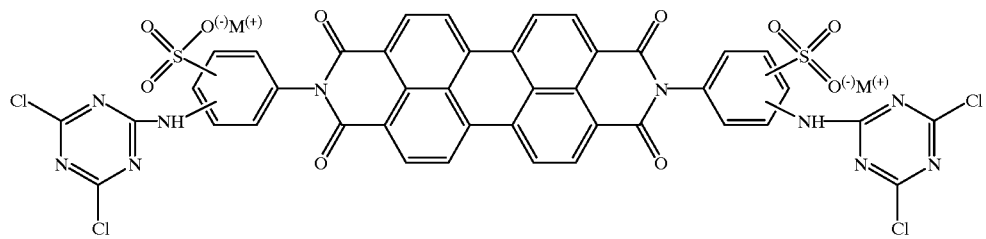

in which M has the meaning given in claim 1, with compounds of the formulae IV, V, VI, VII or a combination thereof

H—A—X—COOM  (IV)

H—A—X—SO$_3$M  (V)

H—O—R$^5$  (VI)

H—NR$^6$R$^7$  (VII)

in which A, X, M, R$^5$, R$^6$ and R$^7$ are as defined in claim 1.

* * * * *